Oct. 27, 1931.  A. FRYKMAN  1,829,133
WHEEL ALIGNING DEVICE
Filed Aug. 1, 1929    2 Sheets-Sheet 1
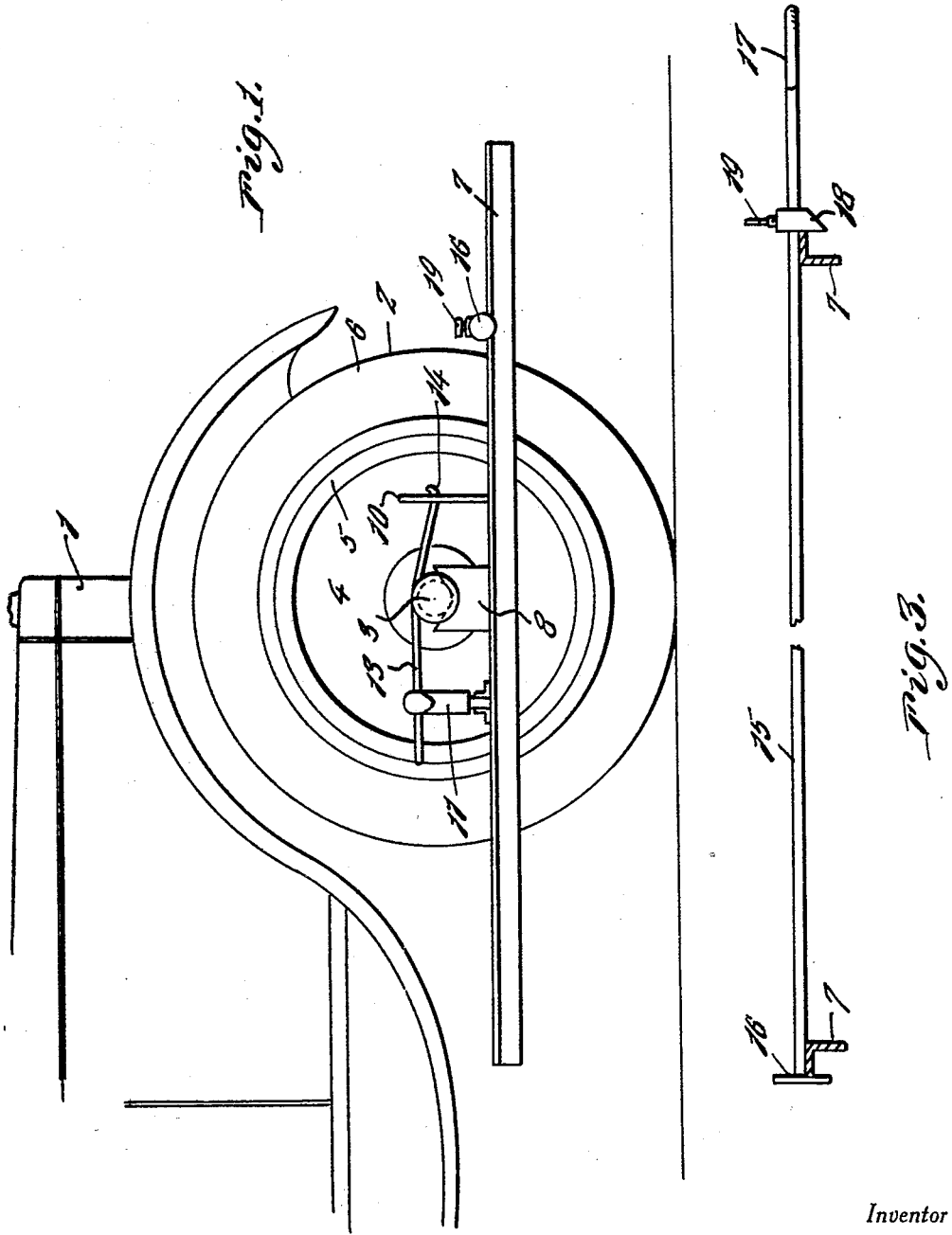
Inventor
*August Frykman*
By *Clarence A. O'Brien*
Attorney

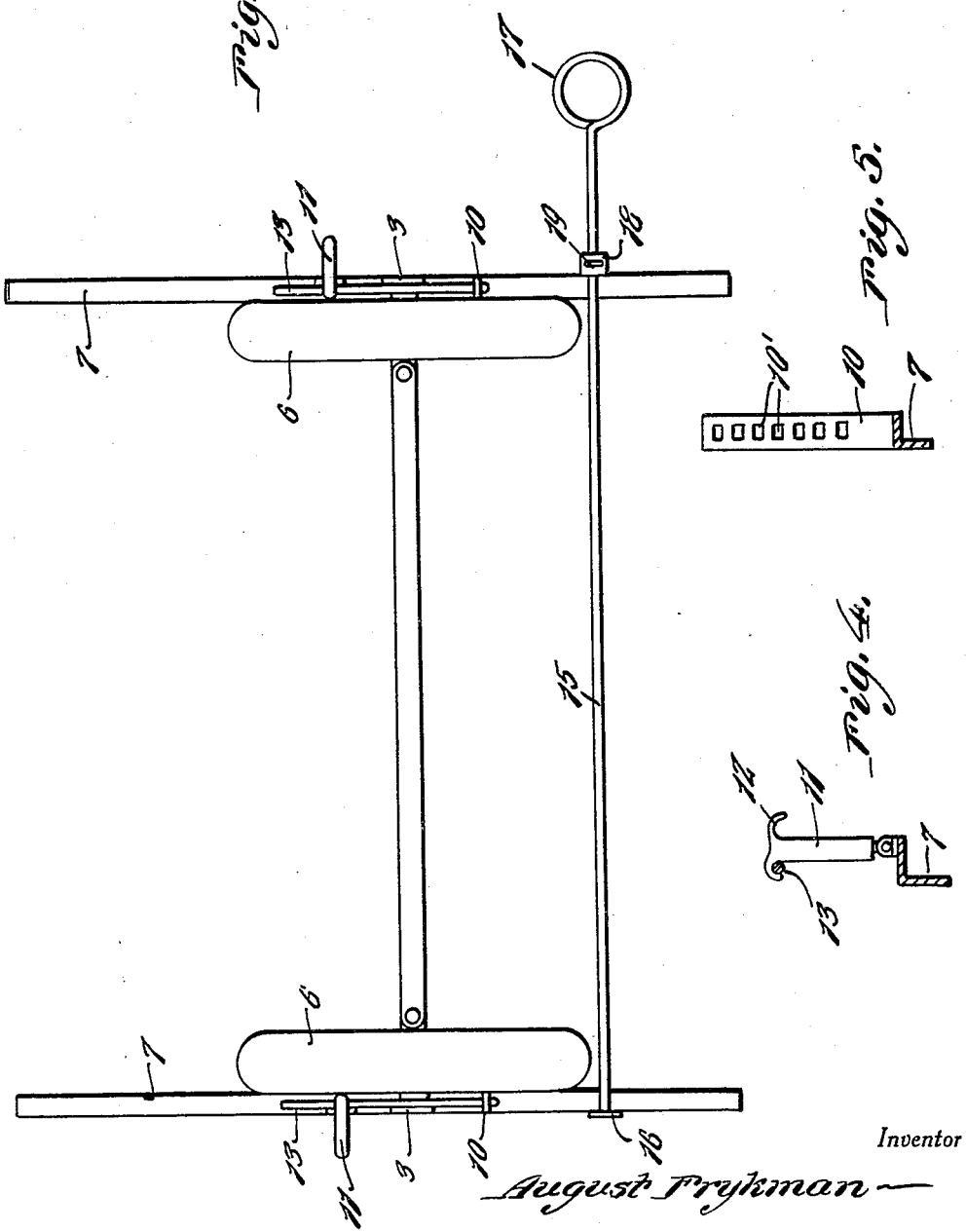

Patented Oct. 27, 1931

1,829,133

UNITED STATES PATENT OFFICE

AUGUST FRYKMAN, OF BOTTINEAU, NORTH DAKOTA

WHEEL ALIGNING DEVICE

Application filed August 1, 1929. Serial No. 382,787.

This invention relates to wheel aligning tools or devices and more particularly to devices of this character which are adapted for use in testing and aligning the front wheels of automobiles.

One of the objects of this invention is to provide, in a manner as hereinafter set forth, a device of the above mentioned character which is capable of being expeditiously mounted in position on the wheels of the automobile, which will provide means for determining accurately the relative position of the two front wheels, and to permit adjustment of the wheels to be made while the tool is mounted thereon.

Other objects of the invention are to provide a tool of the above mentioned character which will be simple in construction, strong, durable, efficient in its use and which may be manufactured at low cost.

Other objects and advantages of the invention will be apparent from a study of the following specification papers in connection with the accompanying drawings, wherein like characters of reference designate corresponding parts throughout the several views, and in which:

Figure 1 is a view in side elevation of a wheel aligning device constructed in accordance with this invention and showing the same mounted on the automobile in position for use, Figure 2 is a top plan view of the invention, Figure 3 is a view in elevation of the measuring or indicating part used with the device, Figure 4 is a side elevation of one of the elements by means of which the device is secured in position on the automobile, Figure 5 is an elevation of another element for mounting the device on the automobile.

Referring to the drawings in detail, the reference character 1 designates an automobile having the front wheels which are designated generally by the reference characters 2 and have as usual, a hub 3, wheel 4, rim 5 and pneumatic tire 6.

The device constituting this invention comprises a pair of elongated iron bars of inverted L-shaped cross section which are designated by the reference characters 7.

Intermediate their ends the bars 7 have mounted thereon a pair of upstanding hub engaging extensions or blocks 8 the upper ends of which are in the form of a V-shaped groove adapted to receive the hub 3 therein, as clearly shown in Figure 1. This said block 8 is placed on bar 7 extending outwardly on line with standard 10 and spring supported hook 11 so when levers 13 are applied, bars 7 are pressed firmly against tires 6 by a horizontal indicating rod 15 which will be described later.

Forwardly of the block 8 a vertical standard or support 10 is securely mounted on each of the bars 7 which post 10 is provided with a series of vertically spaced openings 10', the purpose of which will be presently set forth. Rearwardly of the block 8, the rod 7 has pivotally connected to the upper face thereof, an extensible hook 11 tensioned by a coil spring enclosed of conventional construction and which is provided with a finger grip 12 to be gripped by the operator.

A bowed securing lever 13 having an upturned end portion 14 projecting through one of the openings 10' in the standard 10 is engaged against the upper surface of the hub. The free end of the lever is adapted to be engaged and retained by the hook 11.

As is clearly illustrated in the drawings the bar 7 extends forwardly and rearwardly beyond the front wheel 2. An indicating rod 15 is adapted to be mounted on the protruding end of the bar 7 for determining the distance therebetween and this rod is provided, at one end with a disk like head 16 and at its opposite end with a finger loop 17.

An indicating element 18 is slidably mounted on the rod 15 and provided with a set screw 19 for securing said element at any desired point on the rod.

The machine is used in the following manner for determining the relative position of the front wheels of an automobile. The rod 15 is mounted upon the forwardly protruding ends of the bars 7 and extends transversely thereof.

The disk like head 16 is engaged with the outer edge of one of the bars 7 and the slidable marker or indicator 18 is moved into engagement with the outer edge of the other of the bars 7 and is locked in this position by means of the set screw 19. The rod 15 is then mounted upon the rearwardly protruding ends of the bars 7 and by noting the position of the marker 18 with respect to the adjacent rear ends of the bars 7 it can be determined whether or not the wheels 2 are parallel with each other.

It is understood that the inner sides of the bars 7 are held in engagement with the side walls of the tire 6 at the point where said bars intersect the same. When it is desired to set the wheels at a predetermined angle with respect to each other, which is commonly known as truing the wheels, the element 18 is secured in the desired position on the rod 15 and said rod is then positioned across the bars 7 at a point forwardly of the tires 6.

The wheels are then adjusted in the usual manner until the bars 7 abut the inner faces of the head 16 and the element 18.

It is thought that the many advantages of the wheel aligning device which is constructed in accordance with this invention is readily understood, and although the preferred embodiment of the invention is illustrated and described, it is to be understood that changes in the details of construction can be had which will fall within the scope of the invention as claimed.

Having thus described my invention, what I claim as new is:

1. A device for facilitating the truing up of vehicle wheels comprising a pair of bars of greater length than the diameter of the wheels, means for suspending the bars from the hubs of a pair of opposed wheels with the bars contacting the outer faces of the wheels, a cross rod having a head at one end for engaging an outer edge of one of the bars and a member adjustably connected with the rod for engaging the outer edge of the other bar.

2. A device for facilitating the truing up of vehicle wheels comprising a pair of bars of greater length than the diameter of the wheels, an upright attached to the central part of each bar and having a recess in its upper end for receiving a portion of the hub of a wheel, a post on each bar at one side of the upright and having a vertical row of holes therein, a hook pivoted to each bar on the other side of the upright, a resilient rod having one end engaging one of the holes in the post and its central part engaging the top of the hub with its other end portion passing through the hook for supporting the bar from the hub with the bar contacting the outer face of a wheel, a rod having a projection at one end thereof for engaging the outer face of one of the bars and an adjustable member on said rod for engaging the outer face of the other bar.

In testimony whereof I affix my signature.

AUGUST FRYKMAN.